United States Patent [19]
Kehr et al.

[11] 3,853,681
[45] Dec. 10, 1974

[54] LAMINATED HONEYCOMB STRUCTURE AND METHOD OF MAKING SAME

[75] Inventors: Clifton L. Kehr, Silver Spring; Walter R. Wszolek, Sykesville; Christian B. Lundsager, Ashton, all of Md.

[73] Assignee: W. R. Grace & Co., New York, N.Y.

[22] Filed: Dec. 2, 1970

[21] Appl. No.: 372,702

Related U.S. Application Data

[62] Division of Ser. Nos. 94,535, Oct. 13, 1971, abandoned, and Ser. No. 800,923, Feb. 20, 1969, Pat. No. 3,660,217.

[52] U.S. Cl. ............... 161/68, 156/197, 156/272, 161/412, 204/159.14, 260/79
[51] Int. Cl. ....... B32b 3/12, B32b 31/28, B01j 1/10, B31d 3/02, C08g 23/00
[58] Field of Search .............................. 161/68–69, 161/412; 156/197, 272, 357, 331; 260/47 UA, 47 XA, 79; 204/159.14, 159.18, 159.22, 159.24

[56] References Cited
UNITED STATES PATENTS

| | | | |
|---|---|---|---|
| 3,006,798 | 10/1961 | Holland | 161/88 X |
| 3,114,666 | 12/1963 | Johnson | 161/68 X |
| 3,676,283 | 7/1972 | Kehr et al. | 161/412 X |

*Primary Examiner*—Philip Dier
*Attorney, Agent, or Firm*—Richard P. Plunkett; Kenneth E. Prince

[57] ABSTRACT

This invention relates to a method and means for laminating superimposed layers of the same or different material by adhering said layers with a novel curable liquid adhesive composition comprising a polyene and a polythiol which, on exposure to ionizing radiation or a free radical generating agent, cures to a solid adhesive under ambient conditions. The novel adhesive can be used in bonding structural cellular material such as honeycomb cores and facings.

3 Claims, 5 Drawing Figures

LAMINATED HONEYCOMB STRUCTURE AND METHOD OF MAKING SAME

This application is a Division of application Ser. No. 94,535, filed Oct. 13, 1971, now abandoned and of application Ser. No. 800,923, filed Feb. 20, 1969 and now Pat. No. 3,660,217.

In the laminating field today the prevalent method of forming a laminate is to take layers cut to the desired size and shape, insert therebetween an adhesive and cure the adhesive while maintaining said layers under pressure at elevated temperatures. For materials such as wood which have sufficient polar groups to bond with the adhesive, the adhesive used is usually phenol formaldehyde or urea formaldehyde which require a fairly extensive time period at the elevated temperatures under high pressures to effect curing of the adhesive. These elevated temperatures can often times cause distortion in the layers being laminated. Additionally, some metal alloys, e.g., aluminum alloys, cannot tolerate high temperatures because they lose their strength characteristics and become brittle.

For non-polar materials such as metals, the adhesive is usually an epoxy type resin. However, after the epoxy type resin is admixed with the hardener material, the adhesive has limited pot life and must be used within a relatively short period before curing takes place.

One object of the instant invention is to produce an adhesive composition which does not require elevated heat and pressure to effect curing.

Another object of the instant invention is to provide an adhesive composition that has an extensive pot life which is not dependent upon admixture with other materials. These and other objects will become apparent from a reading hereinafter.

Summarily, the above and other objects are obtained by forming a liquid curable adhesive composition comprising a polyene containing at least two reactive unsaturated carbon to carbon bonds per molecule and a polythiol containing at least two thiol groups per molecule, the total combined functionality of (a) the reactive unsaturated carbon to carbon bonds per molecule in the polyene and (b) the thiol groups per molecule in the polythiol being greater than 4, applying said adhesive composition to at least one surface of each of the various layers to be laminated, forming said layers into a sandwich, optionally passing said sandwich through a mechanism to compress said sandwich, e.g., nip rolls, and thereafter subjecting said sandwich to ionizing radiation to cure said adhesive.

Honeycomb core may be produced by applying to opposite sides of an elongated web or sheet material the polyenepolythiol adhesive in alternately spaced or staggered lines. By lapping the sheet back and forth over itself, superimposed layers of the material with the adhesive lines thereon are built up into a stack of unexpanded honeycomb. The unexpanded honeycomb is then exposed to ionizing radiation to cure the adhesive and bond the layers in the stack together. The stack can thereafter be sliced, preferably transversely, through the lines of adhesive to form one or several blocks or slices of unexpanded honeycomb. The unexpanded honeycomb can thereafter be expanded by conventional means such as applying uniform expansion forces to opposite end webs of the block or stack at a plurality of substantially equidistantly spaced sites throughout the lengths of each end web of the material. The expanded cores can then be adhered to facings using a different adhesive system or, if appropriate, the same adhesive composition cured by ionizing radiation.

The polythiols and one group of operable polyenes which can be cured rapidly as an adhesive by the practice of the instant invention are set out in a copending application assigned to the same assignee having Ser. No. 617,801 filed Feb. 23, 1967 now abandoned and are incorporated herein by reference. That is, one group of polyenes operable in the instant invention are those having a molecular weight in the range 50 to 20,000, a viscosity ranging from 0 to 20 million centipoises at 70°C of the general formula: $[A]\!\!-\!\!(X)_m$ wherein X is a member of the group consisting of and $R—C \equiv C—$; $m$ is at least 2; R is independently selected from the group consisting of hydrogen, halogen, aryl, substituted aryl, cycloalkyl, substituted cycloalkyl, aralkyl, substituted aralkyl and alkyl and substituted alkyl groups containing 1 to 16 carbon atoms and A is a polyvalent organic moiety free of (1) reactive carbon to carbon unsaturation and (2) unsaturated groups in conjunction with the reactive ene or yne groups in X. Thus A may contain cyclic groupings and minor amounts of hetero atoms such as N, S, P or O but contains primarily carbon-carbon, carbon-oxygen or silicon-oxygen containing chain linkages without any reactive carbon to carbon unsaturation.

Examples of said operable polyenes include, but are not limited to

1. crotyl-terminated polyurethanes which contain two "reactive" double bonds per average molecule in a near terminal position of the average general formula:

wherein $x$ is at least 1.

2. ethylene/propylene/non-conjugated diene terpolymers, such as "Nordel 1040" manufactured by duPont which contains pendant reactive double bonds of the formula: $—CH_2—CH—CH—CH_3$, 3. the following structure which contains terminal reactive double bonds:

where $x$ is at least 1, 4. the following structure which contains near terminal reactive double bonds where $x$ is at least 1.

As used herein polyenes and polyynes refer to simple or complex species of alkenes or alkynes having a multiplicity of pendant, terminally or near terminally positioned reactive carbon to carbon unsaturated functional groups per average molecule. For example, a diene is a polyene that has two reactive carbon to carbon double bonds per average molecule, while a diyne is a polyyne that contains in its structure two reactive carbon to carbon triple bonds per average molecule. Combinations of reactive double bonds and reactive triple bonds within the same molecule are also possible. An example of this is monovinylacetylene, which is a polyeneyne under our definition. For purposes of brevity all these classes of compounds will be referred to hereafter as polyenes.

A second group of polyenes operable in the instant invention includes unsaturated polymeres in which the double or triple bonds occur primarily within the main chain of the molecules. Examples include conventional elastomers (derived primarily from standard diene monomers) such as polyisoprene, polybutadiene, styrene-butadiene rubber, isobutylene-isoprene rubber, polychloroprene, styrene-butadiene-acrylonitrile rubber, and the like; unsaturated polyesters, polyamides, and polyurethanes derived from monomers containing reactive unsaturation, e.g., adipic acid-butenediol, 1,6-hexanediamine-fumaric acid and 2,4-tolylene diisocyanate-butenediol condensation polymers and the like.

A third group of polyenes operable as part of the adhesive composition in this invention includes those polyenes in which the reactive unsaturated carbon to carbon bonds are conjugated with adjacent unsaturated groupings. Examples of operable reactive conjugated ene systems include, but are not limited to, the following:

A few typical examples of polymeric polyenes which contain conjugated reactive double bond groupings such as those described above are polyethyleneether glycol diacrylate having a molecular weight of about 750, polytetramethyleneether glycol dimethacrylate having a molecular weight of about 1175, the triacrylate of the reaction product of trimethylolpropane with 20 moles of ethylene oxide, and the like.

Another group of polyenes operable as part of the adhesive compositions having an -ene or -yne functionality of at least two are formed by reacting either a. An organic epoxide containing at least two groups in its structure with a member of the group consisting of hydrazine, primary amines, secondary amines, tertiary amine salts, organic alcohols and organic acids wherein said group members contain at least one organic substituent containing a reactive ethylenically or ethynylically unsaturated group, or b. An organic epoxide containing at least one organic substituent containing a reactive ethylenically or ethynylically unsaturated group with a member of the group consisting of hydrazine and an organic material containing at least two active hydrogen functions from the group consisting of As used herein for determining the position of the reactive functional carbon to carbon unsaturation, the term "terminal" means that said functional unsaturation is at an end of the main chain in the molecule; whereas by "near terminal" is meant that the functional unsaturation is not more than 16 carbon atoms away from an end of the main chain in the molecule. The term "pendant" means that the reactive carbon to carbon unsaturation is located terminally or near-terminally in a branch of the main chain as contrasted to a position at or near the ends of the main chain. For purposes of brevity all of these positions will be referred to generally as terminal unsaturation.

The liquid polyenes operable in the instant invention contain one or more of the following types of non-aromatic and non-conjugated reactive carbon to carbon unsaturation:

These functional groups as shown in 1–8 supra are situated in a position either which is pendant, terminal or near terminal with respect to the main chain but are free of terminal conjugation. As used herein the phrase "free of terminal conjugation" means that the terminal reactive unsaturated groupings may not be linked directly to non-reactive unsaturated species such as:

and the like so as to form a conjugated system of unsaturated bonds exemplified by the following structure:

On the average the polyenes must contain 2 or more reactive unsaturated carbon to carbon bonds/molecule and have a viscosity in the range from 0 to 20 million centipoises at 70°C Included in the term "polyenes" as used herein are those materials which in the presence of an inert solvent, aqueous dispersion or plasticizer fall within the viscosity range set out above at 70°C. Operable polyenes in the instant invention have molecular weights in the range 50–20,000, preferably 500 to 10,000.

As used herein the term "reactive" unsaturated carbon to carbon groups means groups having the structures as shown in 1–8 supra which will react under proper conditions as set forth herein with thiol groups to yield the thioether linkage as contrasted to the term "unreactive" carbon to carbon unsaturation which means groups when found in aromatic nucleii (cyclic structures exemplified by benzene, pyridine, anthracene, and the like) which do not under the same conditions react with thiols to give thioether linkages. In the instant invention, adhesive products from the reaction of polyenes with polythiols which contain 2 or more thiol groups per average molecule are called polythioether polymers or polythioethers.

As used herein, the term polythiols refers to simple or complex organic compounds having a multiplicity of pendant or terminally positioned —SH functional groups per average molecule.

On the average the polythiols must contain 2 or more —SH groups/molecule. They usually have a viscosity range of 0 to 20 million centipoises (cps) at 70°C as measured by a Brookfield Viscometer. Included in the term "polythiols" as used herein are those materials which in the presence of an inert solvent, aqueous dispersion or plasticizer fall within the viscosity range set out above at 70°C. Operable polythiols in the instant invention usually have molecular weights in the range 50–20,000, preferably 100–10,000.

The polythiols operable in the instant invention can be exemplified by the general formula: $R_8$-$(SH)_n$ where $n$ is at least 2 and $R_8$ is a polyvalent organic moiety free from reactive carbon to carbon unsaturation. Thus $R_8$ may contain cyclic groupings and minor amounts of hetero atoms such as N, S, P or O but primarily contains carbon-hydrogen, carbon-oxygen, or silicon-oxygen containing chain linkages free of any reactive carbon to carbon unsaturation.

One class of polythiols operable with polyenes in the instant invention to obtain a polythioether adhesive are esters of thiol-containing acids of the general formula: HS—$R_9$-COOH where $R_9$ is an organic moiety containing no reactive carbon to carbon unsaturation with polyhydroxy compounds of the general structure: $R_{10}$—$(OH)_n$ where $R_{10}$ is an organic moiety containing no reactive carbon to carbon unsaturation and $n$ is 2 or greater. These components will react under suitable conditions to give a polythiol having the general structure:

where $R_9$ and $R_{10}$ are organic moieties containing no reactive carbon to carbon unsaturation and $n$ is 2 or greater.

Certain polythiols such as the aliphatic monomeric polythiols (ethane dithiol, hexamethylene dithiol, decamethylene dithiol, tolylene-2,4-dithiol, etc. and some polymeric polythiols such as a thiol-terminated ethylcyclohexyl dimercaptan polymer, etc. and similar polythiols which are conveniently and ordinarily synthesized on a commercial basis, although having obnoxious odors, are operable in this invention but many of the end products are not widely accepted from a practical, commercial point of view. Examples of the polythiol compounds preferred for this invention because of their relatively low odor level include, but are not limited to, esters of thioglycolic acid (HS—$CH_2$COOH), α-mercaptopropionic acid (HS—CH($CH_3$)—COOH) and β-mercaptopropionic acid (HS—$CH_2CH_2$COOH) with polyhydroxy compounds such as glycols, triols, tetraols, pentaols, hexaols, etc. Specific examples of the preferred polythiols include, but are not limited to, ethylene glycol bis(thioglycolate), ethylene glycol bis(β-mercaptopropionate), trimethylolpropane tris(-thioglycolate), trimethylolpropane tris(β-mercaptopropionate), pentaerythritol tetrakis (thioglycolate) and pentaerythritol tetrakis (β-mercaptopropionate), all of which are commercially available. A specific example of a preferred polymeric polythiol is polypropylene ether glycol bis(β-mercaptopropionate) which is prepared from polypropylene ether glycol (e.g., Pluracol P2010. Wyandotte Chemical Corp.) and β-mercaptopropionic acid by esterification.

The preferred polythiol compounds are characterized by a low level of mercaptan-like odor initially, and after reaction, give essentially odorless polythioether end products which are commercially attractive and useful adhesives for both indoor and outdoor applications.

The term "functionality" as used herein refers to the average number of ene or thiol groups per molecule in the polyene or polythiol, respectively. For example, a triene is a polyene with an average of three reactive carbon to carbon unsaturated groups per molecule and thus has a functionality ($f$) of three. A polymeric dithiol is a polythiol with an average of two thiol groups per molecule and thus has a functionality ($f$) of two.

It is further understood and implied in the above definitions that in these systems, the functionality of the polyene and the polythiol component is commonly expressed in whole numbers although in practice the actual functionality may be fractional. For example, a polyene component having a nominal functionality of 2 (from theoretical considerations alone) may in fact have an effective functionality of somewhat less than 2. In an attempted synthesis of a diene from a glycol in which the reaction proceeds to 100% of the theoretical value for complete reaction, the functionality (assuming 100% pure starting materials) would be 2.0. If however the reaction were carried to only 90% of theory for complete reaction, about 10% of the molecules present would have only one ene functional group, and there may be a trace of materials that would have no ene functional groups at all. Approximatley 90% of the molecules, however, would have the desired diene structure and the product as a whole then would have an actual functionality of 1.9. Such a product is useful as an adhesive in the instant invention and is referred to herein as having a functionality of 2.

The aforesaid polyenes and polythiols, can if desired, be formed or generated in situ and still be rapidly cured by the process of the instant invention.

To obtain the maximum strength, solvent resistance, creep resistance, heat resistance and freedom from tackiness, the reactive adhesive components consisting of the polyenes and polythiols of this invention are formulated in such a manner as to give solid, crosslinked, three dimensional network polythioether polymer systems on curing. In order to achieve such infinite network formation the individual polyenes and polythiols must each have a functionality of at least 2 and the sum of the functionalities of the polyene and polythiol components must always be greater than 4. Blends and mixtures of the polyenes and the polythiols containing said functionality are also operable herein.

The adhesive compositions to be cured, i.e., (converted to solid resins or elastomers) in accord with the present invention may, if desired, include such additives an antioxidants, accelerators, dyes, inhibitors, activators, fillers, pigments, anti-static agents, flame-retardant agents, thickeners, thixotropic agents, surface-active agents, viscosity modifiers, extending oils, plasticizers, tackifiers and the like within the scope of this invention. Such additives are usually preblended with the polyene or polythiol prior to or during the compounding step. Operable fillers include natural and synthetic resins, carbon black, glass fibers, wood flour, clay, silica, alumina, carbonates, oxides, hydroxides, silicates, glass flakes, glass beads, borates, phosphates, diatomaceous earth, talc, kaolin, barium sulfate, calcium sulfate, calcium carbonate, antimony oxide and the like. The aforesaid additives may be present in quantities up to 500 parts or more per 100 parts of the polyene-polythiol adhesive compositions by weight and preferably 0.005–300 parts on the same basis.

In all the curable adhesive systems herein, the compositions consist of 2 to 98 parts by weight of a polyene containing at least 2 reactive unsaturated carbon to carbon bonds per molecule and 98 to 2 parts by weight of a polythiol containing at least 2 thiol groups per molecule. If a free radical generating agent is used, it is present in an amount ranging from 0.01 to 10.0 parts by weight of the polyene-polythiol adhesive composition.

The polyene-polythiol adhesive composition of the instant invention can be cured by ionizing irradiation. A preferred feature of the ionizing irradiation operation of the instant invention is treatment with high energy particle irradiation or by gamma-rays or x-rays. Irradiation employing particles in the instant invention includes the use of positive ions, (e.g., protons, alpha particles and deuterons), electrons or neutrons. The charged particles may be accelerated to high speeds by means of various voltage gradient mechanisms such as a Van de Graaff generator, a cyclotron, a Cockroft Walton accelerator, a resonant cavity accelerator, a betatron, a G. E. resonant transformer, a synchrotron or the like. Furthermore, particle irradiation may also be supplied from radioactive isotopes or an atomic pile. Gamma rays or x-rays may be obtained from radio isotopes (e.g., cobalt 60) or by particle bombardment of suitable target material (e.g., high energy electrons on a gold metal target.

The dose rate for the irradiation operable to cure the adhesive in the instant invention is in the range 0.00001 to 10.0 megarads/second.

The amount of ionizing radiation which is employed in curing the polymeric adhesive material in the instant invention can vary between broad limits. Radiation dosages of less than a megarad up to 20 megarads or more for electrons are operable, preferably 0.1 to 5 megarads energy absorbed are employed. For gamma-rays or x-rays, radiation dosages in the range 0.0001 to 5.0 megarads energy absorbed are operable. The irradiation step can be performed at temperatures ranging from below room temperature up to 150°C or more with the temperatues above the polymer melting points in most cases affording greater crosslinking rates and efficiency.

When using ionizing radiation, the depth of penetration is dependent upon the density of the material to be penetrated. When the ionizing irradiation is in the form of electrons, 0.5 to 12 million electron volts (Mev) are usually employed. Where gamma rays or x-rays are employed, a range of 0.01 to 5.0 million electron volts is used. The aforesaid range of voltage will allow penetration of aluminum in the range of 1–1200 mils, of titanium in the range of 1–800 mils and of plastics in the range of 1–4000 mils or more. Additionally if the plastic is in the form of precorragated foam, e.g., styrafoam, with densities as low as 0.5 lbs/ft. far greater depths of penetration are operable. As aforestated if such penetration is not sufficient to cure the adhesive to the entire depth desired when beaming the radiation from one direction only, one may use multiple radiation sources beaming simultaneously or intermittently from diametrically opposite sides of the laminate structure. If bonded thicknesses even greater than this are desired, one can adhere two or more irradiation-bonded sandwiches together using a chemical free radical generating agent which is not dependent on radiation energy to activate the polyene-polythiol adhesive.

The adhesive is usually applied to the substrate layers in thicknesses ranging from 0.05 to 10 mils, preferably about 0.2 to 5 mils.

The curing reaction between the polyene and the polythiol can also be initiated by any free radical mechanism which dissociates or abstracts the hydrogen atom from the SH group (or accomplishes the equivalent thereof) and which is operable under ambient conditions. Thus, it is possible to merely expose the polyene and polythiol admixture to ambient conditions (oxygen from the air is the initiator) and obtain a cured solid adhesive product. Azo compounds or peroxides (with or without amine accelerators) which decompose at ambient conditions are also operable as free radical generating agents capable of curing the polyene-polythiol components of the instant invention to solid adhesive products.

The source of free radicals can be various well known free radical generating agents such as organic peroxides, azo compounds, carbazates as taught in a copending application having Ser. No. 618,345, filed Feb. 4, 1967 now Pat. No. 3,513,125 and assigned to the same assignee, metal salts capable of redox reactions, dioximes, diesters of dioximes and the like. Examples of operable organic peroxides include, but are not limited to, benzoyl peroxide; dicumyl peroxide; 2,5-dimethyl-2,5-di(t-butylperoxy)hexane; 2,5-dimethyl-2,5-di(t-butylperoxy)hexyne-3 and ditertiary bisperoxides of the general formula:

wherein R is a member of the group consisting of methyl and phenyl. Operable azo compounds include, but are not limited to 2-phenylazo-2,4,4-trimethylvaleramide; 2-phenylazoisobutyramide; 2-phenylazo-2,4,4-trimethylvaleronitrile, etc.

Various operable carbazates include, but are not limited to, methyl carbazate, ethyl carbazate, t-butyl carbazate, phenyl carbazate, myristyl carbazate, and the like. When UV transparent layers are being laminated, ultraviolet light (with or without chemical photoinitiators or sensitizers such as benxophenone, acetophenone, acenaphthalene-quinone, methyl ethyl ketone, etc.) yields rapid cures by the practice of the instant invention. One instance where chemical free radical generating agents are employed in the instant invention instead of ionizing radiation is in the case when the ionizing radiation is insufficient to effect curing of the adhesive throughout the entire desired depth of the stack. In this instance, it is possible to cure the polyene and polythiol adhesive to the known penetration depth of the ionizing radiation and thereafter superimpose stacks of the material cured by ionizing radiation upon one another and cure the polyene-polythiol adhesive therebetween by the use of a chemical free radical generating agent. The thus cured stacks can then be cut transversed the adhesive lines and expanded into honeycomb cores by conventional means.

The adhesive may be a single component, i.e. the admixed polyene-polythiol; or a multi component, i.e. mix the polyene and the polythiol and apply on the site. It is preferred to use the single component system due to its ease of useage.

The curing mechanisms for the single component system are ionizing radiation, e.g. an electron beam which is preferred, or ultraviolet light plus a photocuring rate accelerator when the layers are U.V. transparent, and heat. For the multi component system it is possible to use free radical generating agents such as benzoyl peroxide plus a tertiary amine; benzilic acid; oxime esters plus iron salts and other well known chemical free radical generating agents.

The adhesive can be applied by various means. For example, the adhesive can be applied by extrusion; printing which is preferred and which is shown in U.S. Pat. Nos. 3,342,666; 3,006,798; 3,114,666; spraying, brushing, and the like. The polyene-polythiol adhesive can also be used in the form of tape or ribbon by impregnating or coating the polyene-polythiol composition on a woven or non-woven fabric as a support.

The layers which can be adhered and formed into honeycomb cores by the process of the instant invention can be metal foils which are preferred especially aluminum; steel and titanium; plastics as taught in U.S. Pat. No. 3,366,525 which may or may not be transparent to U. V. light, including but not limited to polyethylene, polypropylene, ethylene/propylene copolymer, propylene/vinyl chloride copolymer vinyl chloride/vinyl acetate copolymer, polyvinyl chloride, polyamide, polycarbonate and the like; styrofoam; resin impregnated fabrics both woven and nonwoven; paper; resin impregnated papers; ceramics as taught in U.S. Pat. No. 3,272,686; resin impregnated woven and nonwoven glass fibre composites which are also transparent to U. V. light in many cases and the like. The layers can be precorrugated and adhered by the process of this invention as well as expanded into honeycomb cores after adhesion.

The adhesive composition can be in many forms. That is, the composition can be 100% solids, i.e., without solvents present which is preferred; in liquid, wax, or solid state or thixotropic paste; solutions in organic solvents or plasticizers, dispersions, emulsions or solutions in water.

Figures 1, 2, 3:
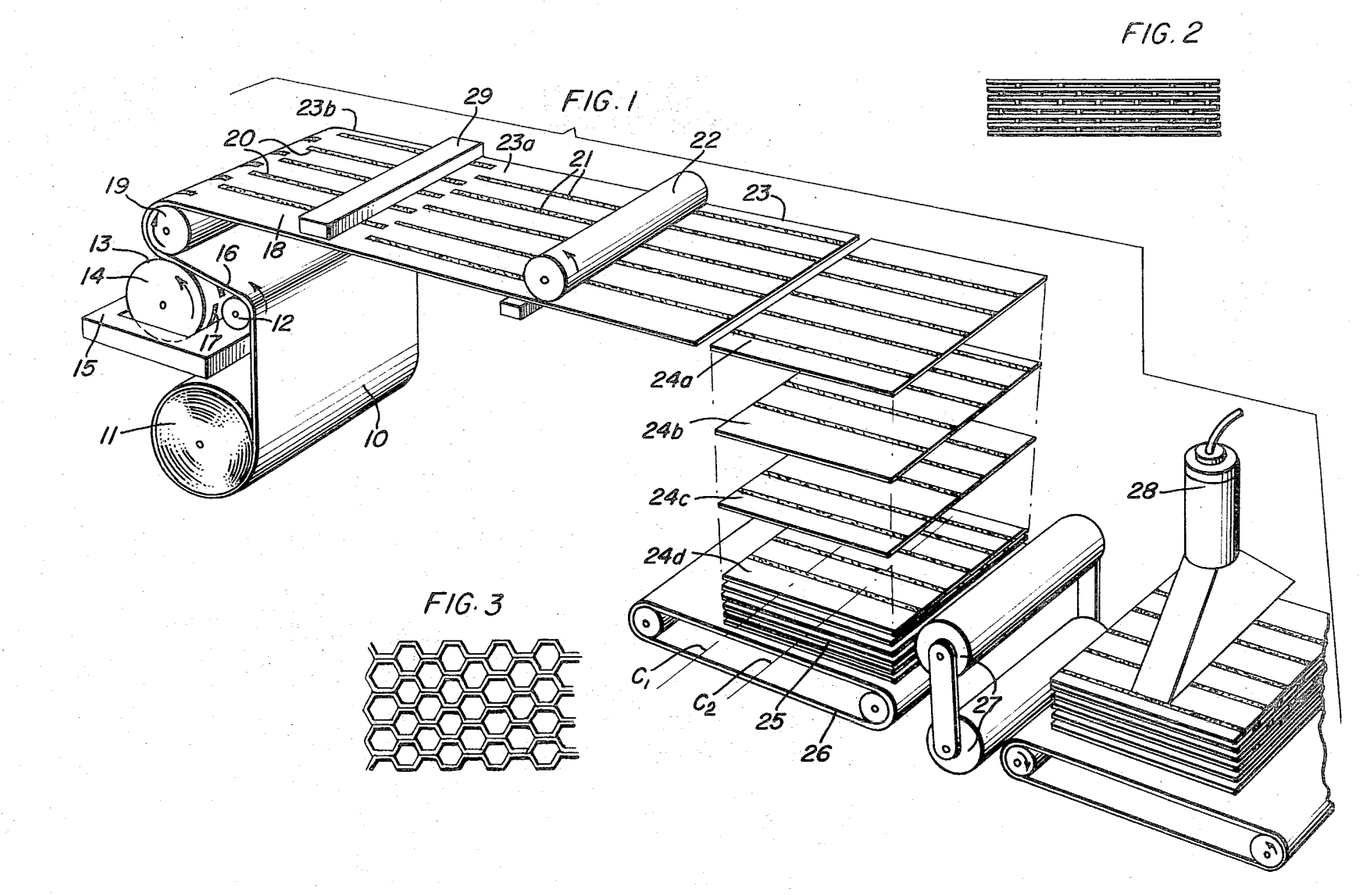
FIG. 1 discloses schematically one suitable apparatus for practicing the curing process.
FIG. 2 is an end elevation view of a cured stack of laminated material produced according to the Process of FIG. 1.
FIG. 3 is a fragmentary side plan view of an expanded section of the material shown in FIG. 2.

FIG. 1 illustrates one method of producing the article shown in FIG. 2. The reference numeral 10 indicates a continuous web of sheet material, such as metal foil, e.g., aluminum, paper, sheet plastic, foam plastic, resin impregnated textile or glass fabric, or the like being fed from a continuous roll 11 over a guide roll 12 and through an adhesive application station indicated generally at 13. More particularly, station 13 can comprise a rotogravure type applicating cylinder 14 monted so that its lower periphery is submerged in a bath of the liquid polyene/polythiol adhesive 15. The circumference of the cylinder 14 is provided with etched lines 16 and 17 which define the pattern of the adhesive lines being applied to surface 18 of the continuous web as the latter moves between the gravure cylinder 14 and a conventional backup roller 19. In FIG. 1 the etched lines 16 extend halfway around the periphery of drum 14 along parallel axis; while etched lines 17 extend the other half the circumference of the drum along parallel axis thereby forming staggered lines of adhesive on each layer in the stack. Thus, rotation of the drum through 180° will cause adhesive line 16 to be applied to surface 18 of the web whereas rotation of the drum through its other half cycle will cause adhesive line 17 to be imprinted thereon. This causes the pattern of the etched lines 20 and 21 to be affixed to the web in staggered relationship. The continuous web with the adhesive thereon is then cut into rectangular sheets of equal dimension by a conventional suitable cutter mechanisms indicated at 22. Specifically, the web material is sheared along spaced transverse cut lines 23a and 23b, which coincide with the line of juncture between adhesive lines 20 and 21 as said lines appear repetively along the length of the web.

The result of the above process is to provide rectangular sheets of the web material of equal dimension such as indicated at 24a–d, said sheets being provided with parallel adhesive bonding lines 20 and 21 in staggered relationship to each other. The sheets are superimposed in a stack 25 touching one another along the spaced parallel adhesive bonding lines 20 and 21, said bonding lines uniting each sheet with said bonding lines touching each sheet with the first adjacent sheet being in staggered relationship to the bonding lines uniting said sheet with a second adjacent sheet. The stack of material 25 is placed on a conveyor belt 26 and passed through compressive means, e.g., nip rolls 27 to maintain the layers in pressed uniformily stacked relationship and to exclude air from between said layers. The stack 25 on exiting the nip rolls 27 is passed under ionizing irradiation source 28 whereat the stack across its entire width is subjected to high energy particle irradiation or gamma rays or x-rays penetrable to the entire depth of the stack. Such irradiation causes curing of the polyene/polythiol adhesive composition almost instantaneously, i.e., 0.5 to 5 seconds.

The thus cured stack 25 may be expanded or opened out into cellular pattern, or the stack may be stored or sheared along parallel cut lines $C_1$ or $C_2$ to form smaller sections or slices of the laminated material which are capable of being expanded or opened out into cellular structure resembling the honeycomb material shown in FIG. 3. Various conventional methods of expanding the laminated material are well known in the art and can be employed in the instant invention such as the method described in U.S. Pat. No. 2,674,295.

Figure 4:
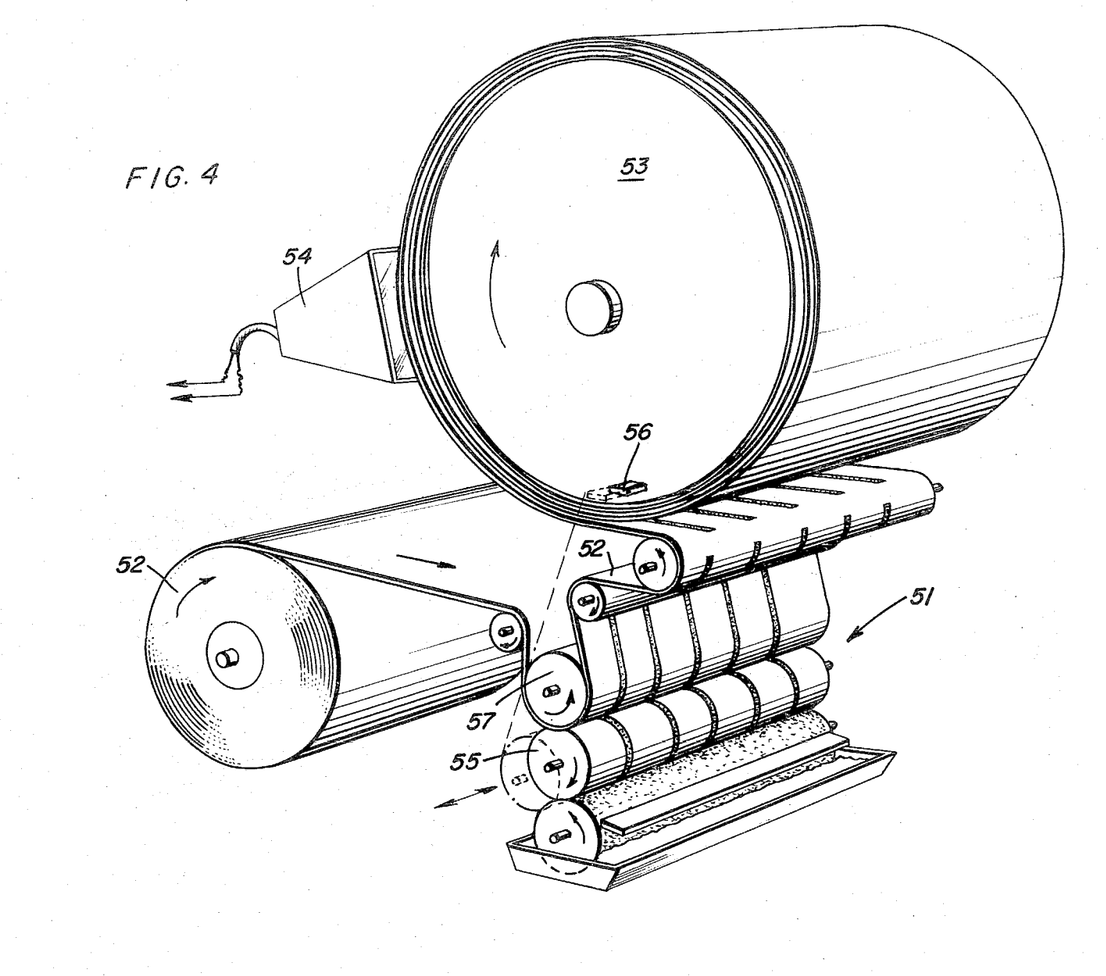
FIG. 4 shows in schematic perspective a view of an apparatus for making honeycomb slab on a larger scale in a more continuous manner, utilizing the near instantaneous curing of the liquid polyene/polythiol adhesives.

In FIG. 4, 50 is a roll of sheet material e.g., paper, plastic, metal foil or the like which is fed through a printing apparatus 51 where the adhesive is applied in a line pattern running lengthwise on the sheet material 52. The printed sheet is wound on a large drum 53 in helical fashion with the adhesive layer towards the center of the drum. An electron beam generator 54 irradiates the adhesive through the layer of sheet metal. Such beams can penetrate several layers of material and the curing of the adhesive may be completed on the first pass or after several passes around the drum, depending on the intensity of the beam and the speed of the drum.

This process is continued until sufficient number of layers are build up on the drum. In order to give the staggering of the adhesive lines on successive layers, which is necessary for expanding into a honeycomb, the printing roller 55 is moved axially by one-half of the distance between the adhesive lines, once per turn of the drum 53. This axial movement is done by mechanical or other means, not shown, and is controlled by a trigger 56 on the drum. To avoid smearing of the adhesive the backup roll, 57, can be lifted momentarily while the displacement of the print roll takes place. The result will be that a small part of the lay-up of sheet material on the drum at the same position on the drum will not be adhesive coated.

When sufficient layers have been build up on the roll the winding is stopped after cutting the sheet before the printing station. The rotation must be continued long enough to assume complete cure of the topmost adhesive layer in the lay-up.

The complete lay up is removed from the drum axially, and is subsequently cut at that point of its circumference where the discontinuity of all the adhesive lines is located. The cylindrical lay-up is then flattened out by conventional means such as a sheet rolling mill. In order to make this possible, without excessive distortion of the individual layers in the lay-up, the diameter of the drum 53 must be large relative to the total thickness of the lay-up. By large is meant ten times or more the thickness of the layup, preferably 20 times or more.

The flattened lay-up is then sheered as previously described to provide slices for expansion into honeycomb.

Figure 5:
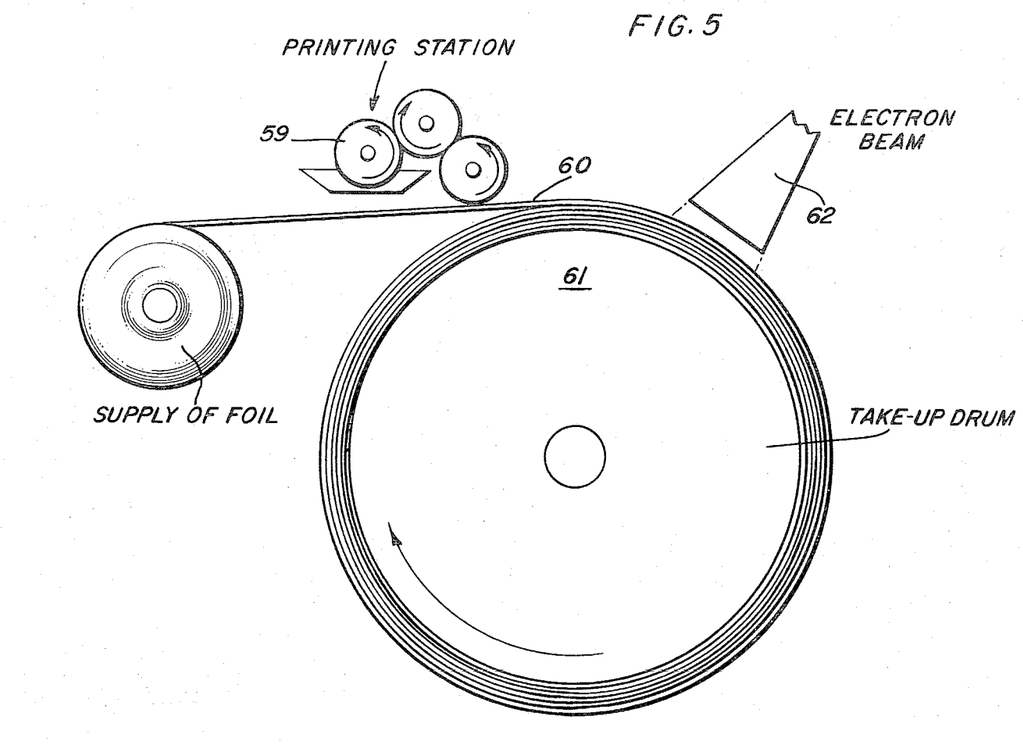
FIG. 5 is a diagrammatic view in end elevation of an alternate apparatus.

In FIG. 5, the printing from printing station 59 is applied to the side of the sheet material 60 on the side away from the center of the take up drum 61. Thus, by passing under the electron beam 62 the adhesive is cured without the shielding of the layer of sheet material on top. The speed must be great enough to give partial curing only, so that sufficient tack of the adhesive is retained to form a good bond when covered with the next layer of sheet material. As before, the curing continues to completion on successive turns of the drum, and similar means to those described with FIG. 4 are used to give staggered printing of the adhesive. This process, by allowing more intensive cure initially has the advantage of operating at greater speed and because of the partial cure of the adhesive before it becomes part of the lay-up, will give a narrower glue line which can be desirable.

A further modification of this type of apparatus not shown makes possible the fabrication of honeycomb sheet of extremely large dimensions. In this modification the adhesive lines are printed on sheet material perpendicular to the direction of length of the sheet material. In all the other modifications the width of the finished expanded honeycomb product is limited to less than the width of the sheet material. With the adhesive printing pattern here described the width of the finished product will be limited by the circumference of the drum only, and can obviously be made very large.

The following examples will aid in explaining, but should not be deemed as limiting, the instant invention. In all cases, unless otherwise noted, all parts and percentages are by weight.

PREPARATION OF POLYENES

EXAMPLE I 1 mole of a commercially available polyoxypropylene glycol commercially avaiable from Union Carbide Co. under the tradename "PPG 2025" was charged to a resin kettle equipped with a condenser, stirrer, thermometer and a gas inlet and outlet. 4 g. of dibutyl tin dilaurate as a catalyst was added to the kettle along with 348 g. (2.0 mole) of tolylene-2,4-diisocyanate and 116 g. (2 moles) of allyl alcohol. The reaction was carried out for 20 minutes at room temperature under nitrogen. Excess alcohol was stripped from the reaction kettle by vacuum over a 1 hour period. The thus formed $CH_2$=CH— terminated liquid prepolymer had a molecular weight of approximately 2400 and will hereinafter be referred to as Prepolymer A.

EXAMPLE II 1 mole diglycidyl ether of Bisphenol A having a molecular weight in the range 370–384 and being commercially available from Shell Chemical Company under the tradename "Epon 828" and 2 moles of allyl hydrazine were dissolved in 500 ml benzene in a beaker at room temperature (25°C). The reaction was continued with stirring for 18 hours during which time the exotherm and reaction temperature was maintained below 80°C. The benzene solvent was removed by vacuum. The thus formed allyl terminated liquid prepolymer will hereinafter be referred to as Prepolymer B.

EXAMPLE III

Example II was repeated except that 2 moles of allyl amine was substituted for the 2 moles of allyl hydrazine. The thus formed allyl terminated liquid prepolymer will hereinafter be referred to as Prepolymer C.

EXAMPLE IV

Example II was repeated except that 2 moles of diallyl amine was substituted for the 2 moles of allyl hydrazine and no benzene solvent was used in the synthesis reaction. The thus formed allyl terminated liquid prepolymer will hereinafter be referred to as Prepolymer D.

EXAMPLE V 1 mole of polyoxypropylenetriamine, having a molecular weight of about 400 and being commercially available from Jefferson Chemical Company under the tradename of "POPTA 403" and 3 moles of allyl glycidyl ether were admixed together at room temperature. The reaction was continued with stirring for 18 hours during which time the reaction temperature was maintained below 50°C. The thus formed allyl terminated liquid prepolymer will hereinafter be referred to as Prepolymer E.

EXAMPLE VI

Using an apparatus similar to that disclosed in FIG. 1, a continuous web of bond paper was fed over a guide roll and through an adhesive application station containing an admixture of Prepolymer A from Example I herein and pentacrythritol tetrakis ($\beta$-mercaptopropionate), a commercially available polythiol from Carlisle Chemical Company sold under the tradename "Q-43" said Prepolymer A polyene: polythiol mole ratio being 1:0.5 respectively. The adhesive was added by means of a rotogravure type applicating cylinder mounted so that its lower perifery was submerged in the bath of the liquid polyene/polythiol adhesive composition. The circumference of the applicating cylinder is provided with etched lines which define the pattern of the adhesive lines being applied to the surface of the continuous paper web as the latter moves between the gravure cylinder and the conventional backup roller. The etched lines around half of the circumference of the applicating cylinder are parallel to each other and parallel to the etched lines extending around the other half of the cylinder but in staggered relation thereto. The paper web was then cut at the juncture between adhesive lines and the cut sheets are stacked one on top of the other so that the adhesive lines on one are in staggered parallel relationship to the next adjacent adhesive lines on the proximate sheet. When the stack consists of 30 sheets of paper, the stack is passed through nip rolls to press the sheets more firmly together and excluded air therebetween prior to passage under the beam of a 2 million electron volt (Mev) Van de Graaff electron accelerator at a pass rate of 18.4 inches per minute to cure the adhesive. The accelerator was maintained at a beam current of 195 microampers while the stack was passed under its 12 inch scan window at a distance of 10 inches therefrom. The thus cured unexpanded laminated paper stack was cut across its width into 1 inch sections and expanded into honeycomb by conventional expansion means.

EXAMPLE VII

A 2 foot wide continuous web of aluminum foil (6.7 mils thick) was fed using the apparatus in FIg. 1 from a continuous roll over a guide roll to an adhesive application station. The adhesive consisted of Prepolymer B polyene from Example II and pentaerythritol tetrakis ($\beta$-mercaptopropionate) a commercially available polythiol from Carlisle Chemical Co. sold under the tradename "A-43", the mole ratio of polyene to polythiol being 1:0.5 respectively. The rotogravure applicating cylinder applied 0.3 cm. wide (1 mil thick) parallel lines of the adhesive with spacings therebetween of 0.3 cm. for a length of 4 feet at which point adhesive lines of the same width, thickness and length were applied in staggered relationship to the first set of adhesive lines by the other half circumference of the applicating cylinder. The aluminum web was cut into 4 foot lengths at the lines of juncture between each set of staggered adhesive lines and stacked one on top of another so that the adhesive lines were staggered on each succeeding layer. After the stack of aluminum layers with staggered lines of adhesive therebetween reached 100 layers of aluminum, the stack was passed between nip rolls to more firmly compress the stack and to exclude air from between the layers. The stack was then passed under a 7.5 million electron volt (Mev) Linac electron accelerator at a pass rate of 18.4 inches/minute to cure the adhesive. The accelerator was maintained at a beam current of 390 microamperes while the stack was passed under its 24 inch scan window at a distance of 10 inches therefrom. The thus cured stack was cut across its 24 inch width into 1 inch sections and expanded into honeycomb core 11.8 inches thick by conventional expansion means. A sandwich structure was made from the expanded honeycomb core by applying the adhesive composition herein to the edges of the core and interposing the cores between a pair of surface sheets of aluminum cut to the desired plan form dimensions to coincide with the core with the direction of the core cells extending normal to the surface sheets whereby the edges of the cells are opposite the inner surfaces of said aluminum surface sheets. The sandwich was maintained together under contact pressure and passed under with one aluminum surface sheet proximate a 2 Mev Van de Graaff electron accelerator at a pass rate of 18.4 inches/minute to cure the adhesive and bond the aluminum facing to the aluminum honeycomb core. The electron accelerator was maintained at a beam current of 195 microampers while the sandwich was passed under its 24 inch scan window at a distance of 10 inches therefrom. The thus formed aluminum honeycomb sandwich can be used as aluminum siding on houses and buildings as well as various airplane parts.

EXAMPLE VIII

Example VII was repeated to form two cured aluminum stacks of each of 100 layers thickness. By means of a two component mixing metering device, one component of which contained 100 parts of Prepolymer B and 1 part benzoyl peroxide and the other component containing 85 parts of pentaerythritol tetrakis ($\beta$-mercaptopropionate) and 2 parts of dimethylanaline, parallel lines of the admixture of the two adhesive components were placed on the top layer of the bottom stack and the other stack was placed thereon. Within 5 minutes the adhesive composition between the two stacks was cured. The thus cured stacks were cut across their 24 inch width into 2 inch sections and expanded into honeycomb core 23.5 inches thick by conventional expansion means.

EXAMPLE IX

Example VII was repeated except that Prepolymer C from Example III was substituted for Prepolymer B. The cured aluminum was expanded into a honeycomb core in excess of 11 inches thick by conventional expansion means.

EXAMPLE X

Example VII was repeated except that prepolymer D from Example IX was substituted for Prepolymer B. The cured aluminum stack was expanded into honeycomb core in excess of 11 inches thick by conventional expansion means.

EXAMPLE XI

Example VII was repeated except that Prepolymer E from Example V was substituted for Prepolymer B and trimethylolpropane tris ($\beta$-mercaptopropionate) a commercially available polythiol from Carlisle Chemical Company sold under the tradename "P-33" was substituted for the pentaerythritol tetrakis ($\beta$-mercaptopropionate). The mole ratio of the Prepolymer E polyene to the polythiol was 1:1. The resultant cured aluminum stack was expanded into a honeycomb core having a thickness in excess of 11 inches by conventional expansion means.

EXAMPLE XII

A 2 foot wide continuous web of aluminum foil (7.0 mils thick) was fed usiong the apparatus in FIG. 4 from a continuous roll over a guide roll to an adhesive application station. The adhesive consisted of Prepolymer B polyene from Example II and pentaerythritol tetrakis ($\beta$-mercaptopropionate) a commercially available polythiol from Carlisle Chemical Co. sold under the tradename "Q-43", the mole ratio of polyene to polythiol being 1:0.5 respectively. The rotogravure applicating cylinder applied 0.3 cm. wide (1 mil thick) parallel lines of the adhesive with spacings therebetween of 0.3 cm. for a length of 8 feet at which point adhesive lines of the same width, thickness and length were applied in staggered relationship by moving the rotogravure applicating cylinder axially one half of the distance between the first set of parallel adhesive line by means of a trigger mechanism on the take up drum. The trigger mechanism is so set as to apply a set of parallel adhesive lines for a distance equal to the circumference of the rotating take up drum and then apply a staggered set of parallel adhesive lines for another circumference of the take up drum. The continuous web with sets of staggered parallel adhesive lines running lengthwise on the web is wound on the take up drum in helical fashion with the adhesion layer towards the center of the drum. A 2 Mev Vande Graaff electron accelerator irradiated the adhesive composition through one thickness of the aluminum web as it passes under the generators 24 inch scan window at a distance of 10 inches therefrom at a rate of 18.4 inches/minute. The generator was maintained at a beam current of 195 microamperes. After 100 layers of aluminum with cured adhesive therebetween were wound around the take up drum, the system was shut down and the built up cured aluminum sandwich was removed from the drum by cutting the sandwich at the juncture of the staggered sets of cured adhesive lines. The thus cured laminate was cut into 1 inch sections and expanded into honeycomb by conventional means.

EXAMPLE XIII

A 4 foot wide continuous web of polyethylene terephthalate, coated with nitrocellulose lacquer sold under the tradename "Mylar" by E. I. duPont and Co. having a thickness of 0.003 inches and a density of 1.3 g/cm$^3$ was fed using the apparatus in FIG. 1 from a continuous roll over a guide roll to an adhesive application station. The adhesive consisted of Prepolymer B polyene from Example II and pentaerythritol tetrakis ($\beta$-mercaptopropionate) a commercially available polythiol from Carlisle Chemical Co. sold under the tradename "Q-43", the mole ratio of polyene to polythiol being 1:0.5 respectively. The rotogravure application cylinder applied to the coated side of the Mylar 0.3 cm. wide (0.5 mil thick) parallel lines of the adhesive with spacings therebetween of 0.3 cm. for a length of 4 feet at which point, adhesive lines of the same width, thickness and length were applied in staggered relationshp to the first set of adhesive lines by the other half circumference of the applicating cylinder. The Mylar web was cut into 4 foot lengths at the lines of juncture between each set of staggered adhesive lines and stacked one on top of the other so that the adhesive lines were staggered on each succeeding layer. After the stacked Mylar layers with staggered lines of adhesives therebetween reached 130 layers of Mylar, the stack was passed between nip rolls to more firmly compress the stack and to exclude air from between the layers. The stack was then passed under a 3.0 million electron volts (Mev) Vande Graaff electron accelerator at a pass rate of 18.4 inches per minute to cure the adhesive. The accelerator was maintained at a beam current of 760 microamperes while the stack was passed under its 48 inch can window at a distance of 10 inches therefrom. The thus cured stack was expanded into honeycomb core of approximately 2 foot thickness by conventional expansion means.

EXAMPLE XIV

Example VII was repeated except that the adhesive consisted of triallyl urea as the polyene and trimethylolpropane tris ($\beta$-mercaptopropionate) a commercially available polythiol from Carlisle Chemical Co. under the tradename "P-33", the mole ratio of the polyene:polythiol being 1:1. The cured honeycomb core on expansion, expanded to a thickness in excess of 10 inches.

EXAMPLE XV

Example VII was repeated except that the adhesive consisted of diallylallylphosphonate, a polyene commercially available from Aldrich Chemical Co., Milwaukee, Wisconsin and the polythiol was pentaerythritol tetrakis ($\beta$-mercaptopropionate), the mole ratio of the polyene: polythiol being 4:3 respectively. The thus cured honeycomb on expansion, expanded to a thickness greater than 10 inches.

EXAMPLE XVI

Example VII was repeated except that the adhesive consisted of triacrylate of the reaction product of trimethyolpropane and ethylene oxide as the polyene and trimethylolpropane tris(β-mercaptopropionate) as the polythiol, the mole ratio of the polyene:polythiol being 1:1. The cured honeycomb was expanded to a thickness greater than 10½ inches.

EXAMPLE XVII

Example VII was repeated except that the adhesive consisted of 100 parts of commercially available styrene-butadiene rubber (25 mole % styrene) as the polyene and and 10 parts pentaerythritol tetrakis (βmercaptopropionate) as the polythiol. The cured honeycomb was expanded to a thickness greater than 10 inches.

EXAMPLE XVIII

To a 2 liter flask equipped with stirrer, thermometer and gas inlet and outlet was charged 450 g. (0.45 moles) of polytetramethylene ether glycol, having a hydroxyl number of 112 and a molecular weight of 1,000, along with 900 g. (0.45 moles) of polytetramethylene ether glycol having a hydroxyl number of 56 and a molecular weight of 2,000, both commercially available from Quaker Oats Co. The flask was heated to 110°C under vacuum and nitrogen and maintained thereat for 1 hour. The flask was then cooled to approximately 70°C whereat 0.1 g. of dibutyl tin dilaurate was added to the flask. A mixture of 78 g. (0.45 moles) of tolylene diisocyanate and 78 g. (0.94 moles) of allyl isocyanate was thereafter added to the flask dropwise with continuous stirring. The reaction was maintained at 70°C for 1 hour after addition of all the reactants. The thus formed allyl terminated prepolymer will hereinafter be referred to as Prepolymer F.

EXAMPLE XIX

Example VII was repeated except that the adhesive consisted of prepolymer F from Example XVIII as the polyene and pentaerythritol tetrakis (β-mercaptopropionate) as the polythiol, the mole ratio of the polyene:polythiol being 2:1 respectively. The cured honeycomb was expanded to a thickness in excess of 10 inches.

What is claimed is:

1. The process of making a honeycomb structure from a laminated stack of web material which comprises
   A. applying to sections of the web material, lines of an adhesive composition consisting essentially of a polyene containing at least two reactive unsaturated carbon to carbon bonds per molecule, said polyene being the triacrylate of the reaction product of trimethylol propane and ethylene oxide, and a polythiol containing at least two thiol groups per molecule, the total combined functionality of (a) the reactive unsaturated carbon to carbon bonds per molecule in the polyene and (b) the thiol groups per molecule in the polythiol being greater than 4;
   B. forming a plurality of said sections in a stack with said lines of adhesive between adjacent sections arranged in staggered relationship;
   C. subjecting said stack to ionizing radiation at a dose rate in the range of 0.00001 to 10.0 megarads/second to cure the adhesive and bond said sections and
   D. expanding said stack to form a honeycomb structure having a plurality of hollow cells.

2. A sandwich structure comprising a pair of surface sheets, a honeycomb core interposed between said surface sheets with the direction of the cells extending normal to the surface sheets, whereby the edges of the cells are opposite the inner surfaces of said surface sheets, adhesive means for bonding the edges of said honeycomb core to the respective surface sheets comprising an adhesive composition consisting essentially of a polyene containing at least two reactive unsaturated carbon to carbon bonds per molecule, said polyene being the triacrylate of the reaction product of trimethylol propane and ethylene oxide, and a polythiol containing at least two thiol groups per molecule, the total combined functionality of (a) the reactive unsaturated carbon to carbon bonds per molecule in the polyene and (b) the thiol groups per molecule in the polythiol being greater than 4; said adhesive composition on being subjected to ionizing radiation at a dose rate in the range 0.00001 to 10.0 megarads/second causing bonding of the edges of said honeycomb core to the respective surface sheets.

3. The process of bonding at least two unexpanded honeycomb cores together which comprises
   1. applying between superposed unexpanded honeycomb cores, lines of an adhesive composition consisting essentially of 2 to 98 parts by weight of a polyene containing at least two reactive unsaturated carbon to carbon bonds per molecule, said polyene being the triacrylate of the reaction product of trimethylol propane and ethylene oxide, 98 to 2 parts by weight of a polythiol containing at least two thiol groups per molecule and 0.01 to 10 parts by weight of the polyene-polythiol composition of a free radical generating agent, the total combined functionality of (a) the reactive unsaturated carbon to carbon bonds per molecule in the polyene and (b) the thiol groups per molecule in the polythiol being greater than 4, said lines of adhesive being in staggered relationship to the adjacent lines of adhesive on the superposed honeycomb cores, and
   2. maintaining said superposed honeycomb cores in contact for a time sufficient to cure the adhesive and effect bonding between said unexpanded honeycomb cores.

* * * * *